US012630569B2

(12) United States Patent
Yasuda et al.

(10) Patent No.: US 12,630,569 B2
(45) **Date of Patent: *May 19, 2026**

(54) METHOD FOR PRODUCING ORGANIC SILICON COMPOUND HAVING KETIMINE STRUCTURE

(71) Applicant: SHIN-ETSU CHEMICAL CO., LTD., Tokyo (JP)

(72) Inventors: Shigeki Yasuda, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 755 days.

This patent is subject to a terminal disclaimer.

(21) Appl. No.: 17/910,865

(22) PCT Filed: Feb. 2, 2021

(86) PCT No.: PCT/JP2021/003700

§ 371 (c)(1), (2) Date: Sep. 12, 2022

(87) PCT Pub. No.: WO2021/181946

PCT Pub. Date: Sep. 16, 2021

(65) Prior Publication Data

US 2023/0103534 A1 Apr. 6, 2023

(30) Foreign Application Priority Data

Mar. 13, 2020 (JP) ................................ 2020-043723

(51) Int. Cl.
*C07F 7/18* (2006.01)
*C07F 7/20* (2006.01)

(52) U.S. Cl.
CPC .............. *C07F 7/1892* (2013.01); *C07F 7/20* (2013.01)

(58) Field of Classification Search
CPC ......... C07F 7/1804; C07F 7/1892; C07F 7/20
See application file for complete search history.

(56) References Cited

U.S. PATENT DOCUMENTS

| | | | | |
|---|---|---|---|---|
| 12,252,500 | B2 * | 3/2025 | Yasuda | C07F 7/081 |
| 2010/0130764 | A1 | 5/2010 | Taniguchi et al. | |
| 2018/0016287 | A1 * | 1/2018 | Cruse | C07F 7/20 |
| 2021/0236206 | A1 | 8/2021 | Yasuda et al. | |
| 2021/0238206 | A1 * | 8/2021 | Yasuda | C07F 7/081 |

FOREIGN PATENT DOCUMENTS

| | | | |
|---|---|---|---|
| JP | 3-263421 | A | 11/1991 |
| JP | 7-247295 | A | 9/1995 |
| JP | 11-349632 | A | 12/1999 |
| JP | 2007-84497 | A | 4/2007 |
| JP | 2019-524736 | A | 9/2019 |
| JP | 2019-194161 | A | 11/2019 |

OTHER PUBLICATIONS

International Search Report, issued in PCT/JP2021/003700, mailed Mar. 16, 2021.

Tsuge et. al., "Synthetic Versatility of N-(Silylmethyl)imines: Water-Induced Generation of N-Protonated Azomethine Ylides of Nonstabilized Type and Fluoride-Induced Generation of 2-Azaallyl Anions", Bulletin of the Chemical Society of Japan, 1986, vol. 59, pp. 2537-2545.

* cited by examiner

*Primary Examiner* — Pancham Bakshi
(74) *Attorney, Agent, or Firm* — Birch, Stewart, Kolasch & Birch, LLP

(57) ABSTRACT

An organic silicon compound having a ketimine structure can be recovered at a high yield through a method for producing an organic silicon compound having a ketimine structure represented by formula (1), the method having a step for reacting an amino-group-containing organic silicon compound represented by formula (2) and a carbonyl compound represented by formula (3) in the presence of an inorganic adsorbent.

(1)

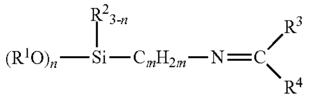

(In the formulas, $R^1$ each independently represent a C1-10 alkyl group or a C6-10 aryl group, $R^2$ each independently represent a C1-10 alkyl group or a C6-10 aryl group, $R^3$ and $R^4$ each independently represent a hydrogen atom, a C1-10 alkyl group, or a C6-10 aryl group, n represents an integer of 1-3, and m represents an integer of 1-12.)

(2)

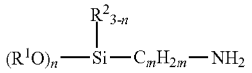

(3)

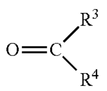

(In the formulas, $R^1$-$R^4$, n, and m are the same as above.)

4 Claims, No Drawings

METHOD FOR PRODUCING ORGANIC SILICON COMPOUND HAVING KETIMINE STRUCTURE

TECHNICAL FIELD

This invention relates to a method for preparing an organosilicon compound having a ketimine structure.

BACKGROUND ART

Silane coupling agents are compounds possessing both a moiety (silicon-bonded hydrolyzable group) having reactivity to inorganic substances and a moiety having a rich reactivity and solubility relative to organic substances in the molecule. They are widely used as resin modifiers.

Among others, silane coupling agents having a ketimine structure are under study as modifiers for conjugated diene copolymers (Patent Document 1).

While Patent Documents 2 and 3 disclose methods for preparing silane coupling agents having a ketimine structure, these methods suffer from insufficient recovery yields of the desired compounds.

Therefore, a method capable of recovering an organosilicon compound having a ketimine structure in high yields is desired.

PRIOR ART DOCUMENTS

Patent Documents

Patent Document 1: JP-A H11-349632
Patent Document 2: JP-A 2019-194161
Patent Document 3: JP-A 2019-524736

SUMMARY OF INVENTION

Technical Problem

An object of the invention, which has been made under the above-mentioned circumstances, is to provide a preparation method capable of recovering an organosilicon compound having a ketimine structure in high yields.

Solution to Problem

Making extensive investigations to solve the outstanding problems, the inventors have found that by reacting an amino-containing organosilicon compound with a carbonyl compound in the presence of an inorganic adsorbent, an organosilicon compound having a ketimine structure can be recovered in high yields. The invention is predicated on this finding.

The invention is defined as follows.

1. A method for preparing an organosilicon compound having a ketimine structure, represented by the formula (1):

[Chem. 1]

(1)

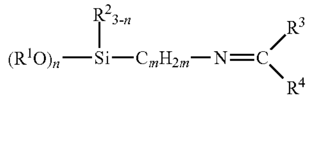

wherein $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, $R^3$ and $R^4$ are each independently hydrogen, a $C_1$-$C_{10}$ alkyl group or $C_6$-$C_{10}$ aryl group, n is an integer of 1 to 3, and m is an integer of 1 to 12, the method comprising the step of reacting an amino-containing organosilicon compound having the formula (2) with a carbonyl compound having the formula (3) in the presence of an inorganic adsorbent,

[Chem. 2]

(2)

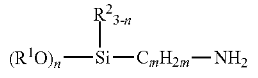

(3)

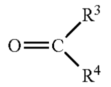

wherein $R^1$, $R^2$, $R^3$, $R^4$, n, and m are as defined above.

2. The method of 1, further comprising the step of taking out the organosilicon compound having formula (1) by distillation purification.
3. The method of 1 or 2 wherein the inorganic adsorbent is at least one member selected from the group consisting of silica, aluminum hydroxide, hydrotalcite, magnesium silicate, aluminum silicate, aluminum oxide, and magnesium oxide.
4. The method of any one of 1 to 3 wherein $R^1$ is methyl or ethyl, $R^3$ is isobutyl, $R^4$ is methyl, both m and n are 3.

Advantageous Effects of Invention

With the preparation method of the invention, the organosilicon compound having a ketimine structure is obtainable in high yields.

DESCRIPTION OF EMBODIMENTS

Now the invention is described in detail.

The invention provides a method for preparing an organosilicon compound having a ketimine structure, represented by the formula (1), comprising the step of reacting an amino-containing organosilicon compound having the formula (2) with a carbonyl compound having the formula (3) in the presence of an inorganic adsorbent.

[Chem. 3]

(1)

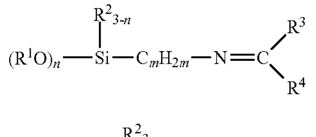

(2)

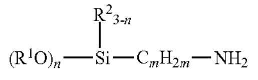

-continued (3)

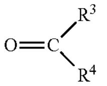

In the formulae, $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, $R^3$ and $R^4$ are each independently hydrogen, a $C_1$-$C_{10}$ alkyl group or $C_6$-$C_{10}$ aryl group.

The $C_1$-$C_{10}$ alkyl group may be straight, cyclic or branched and examples thereof include methyl, ethyl, n-propyl, isopropyl, n-butyl, isobutyl, s-butyl, t-butyl, n-pentyl, neopentyl, n-hexyl, n-heptyl, n-octyl, n-nonyl, n-decyl, cyclopropyl, cyclobutyl, cyclopentyl, cyclohexyl, cycloheptyl, and cyclooctyl.

Exemplary $C_6$-$C_{10}$ aryl groups include phenyl, α-naphthyl, and β-naphthyl.

Of these, $R^1$ and $R^2$ are preferably straight alkyl groups, with methyl and ethyl being more preferred.

$R^3$ and $R^4$ are preferably hydrogen or a $C_1$-$C_{10}$ alkyl group. Methyl, ethyl, n-propyl, n-butyl, and isobutyl are more preferred, methyl and isobutyl being even more preferred, a combination of methyl and isobutyl being most preferred.

In the formulae, n is an integer of 1 to 3, preferably 2 or 3, most preferably 3.

m is an integer of 1 to 12, preferably 2 or 3, most preferably 3.

In the practice of the invention, organosilicon compounds having the formula (4) or (5) are especially preferred.

[Chem. 4]

(4)

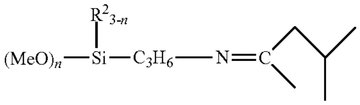

(5)

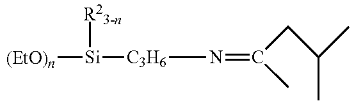

Herein $R^2$ and n are as defined above, Me stands for methyl, and Et stands for ethyl.

Examples of the amino-containing organosilicon compound having formula (2) used in the reaction include 3-aminopropyltrimethoxysilane, 3-aminopropyldimethoxymethylsilane, and 3-aminopropyltriethoxysilane.

Examples of the carbonyl compound having formula (3) include dimethyl ketone, methyl ethyl ketone, methyl isobutyl ketone, acetaldehyde, benzaldehyde, and propionaldehyde.

In the reaction step, the reaction of the amino-containing organosilicon compound with the carbonyl compound is preferably conducted under the conditions that the carbonyl compound is excessive in a molar ratio.

Although the reaction takes place in a solventless system, a solvent may be used. Suitable solvents which can be used herein include hydrocarbon solvents such as pentane, hexane, cyclohexane, heptane, isooctane, benzene, toluene and xylene, with toluene being most preferred. It is noted that the solvents may be used alone or in admixture of two or more.

During the reaction of the amino-containing organosilicon compound with the carbonyl compound, water resulting from the reaction must be removed from the reaction system.

Although means for removing water is not particularly limited, preference is given to a method of distilling off the carbonyl compound remaining in excess in the system or the solvent using a Dean-Stark apparatus or the like for reflux.

Although the reaction temperature is not particularly limited as long as water can be distilled off, the temperature is preferably 100 to 200° C.

In the preparation method of the invention, the amino-containing organosilicon compound having formula (2) is reacted with the carbonyl compound having formula (3) in the presence of an inorganic adsorbent.

When the inorganic adsorbent is omitted, side reactions take place simultaneously. In the case of the organosilicon compound having formula (7), for example, organosilicon compounds having formulae (8) to (11) form, and consequently, the recovery yield of the target compound is lowered.

For increasing purity, the resulting compound having formula (1) is preferably purified by distillation.

[Chem. 5]

(7)

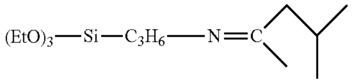

(8)

$(EtO)_3$—Si—$C_3H_6$—$NH_2$ (9)

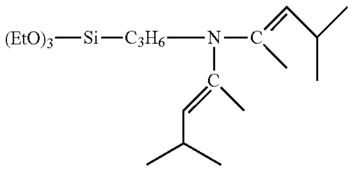

(10)

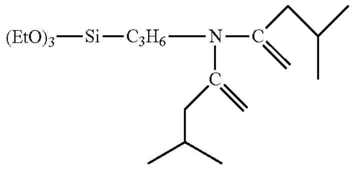

(11)

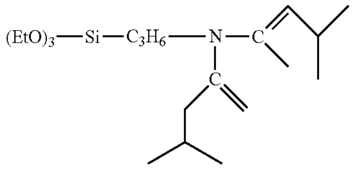

Examples of the inorganic adsorbent include silica, aluminum hydroxide, hydrotalcite, magnesium silicate, aluminum silicate, aluminum oxide, magnesium oxide, and aluminum oxide/magnesium oxide solid solution, which may be used alone or in admixture.

The inorganic adsorbent is commercially available, for example, as Kyowaad series from Kyowa Chemical Industry Co., Ltd., e.g., Kyowaad 100, 200, 300, 500, 600, 700, and 2000. Inter alia, Kyowaad 500 ($Mg_6Al_2(OH)_{16}CO_3 \cdot mH_2O$)

which is synthetic hydrotalcite is especially preferred from the standpoint of treatment efficiency.

The amount of the inorganic adsorbent used is preferably 0.005 to 5.0 parts by weight, more preferably 0.01 to 0.2 parts by weight per 100 parts by weight of the organosilicon compound having formula (3), from the aspects of increasing treatment efficiency and facilitating removal of the inorganic adsorbent after the treatment.

EXAMPLES

Examples and Comparative Examples are given below for further illustrating the invention although the invention is not limited thereto.

It is noted that the percent yield reported below is computed according to the following formula (I).

[final recovery amount (g) of ketimine structure-bearing organosilicon compound]/[{molecular weight (g/mol) of ketimine structure-bearing organosilicon compound}×{amount (mol) of amino-containing organosilicon compound used in reaction}] (I)

[Example 1] Preparation of Organosilicon Compound (6)

[Chem. 6]

(6)

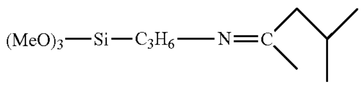

A 5-L separable flask equipped with a stirrer, reflux condenser, dropping funnel and thermometer was charged with 2,028 g (18.4 mol) of methyl isobutyl ketone and 1.2 g (0.06 wt % relative to methyl isobutyl ketone) of Kyowaad 100 (available from Kyowa Chemical Industry Co., Ltd., the same holds true, hereinafter). At an internal temperature of 105-110° C., 540 g (3.01 mol) of 3-aminopropyltrimethoxysilane was added dropwise over 1 hour, followed by stirring at 115° C. for 8 hours. During dropwise addition and aging, water formed by reaction was removed by refluxing along with methyl isobutyl ketone. Analysis by gas chromatograph confirmed that the peaks assigned to 3-aminopropyltrimethoxysilane disappeared. After aging, 1,400 g of pale yellow transparent solution was obtained. The solution was distilled under conditions: 10 Torr and 170° C. for purification, obtaining 720 g (yield 91.5%) of colorless transparent liquid. On $^1$H-NMR analysis, it was identified as organosilicon compound of formula (6).

Example 2

The organosilicon compound of formula (6) was prepared by the same procedure as in Example 1 except that Kyowaad 100 was replaced by the same amount of Kyowaad 200.

Example 3

The organosilicon compound of formula (6) was prepared by the same procedure as in Example 1 except that Kyowaad 100 was replaced by the same amount of Kyowaad 300.

Example 4

The organosilicon compound of formula (6) was prepared by the same procedure as in Example 1 except that Kyowaad 100 was replaced by the same amount of Kyowaad 500.

Example 5

The organosilicon compound of formula (6) was prepared by the same procedure as in Example 1 except that Kyowaad 100 was replaced by the same amount of Kyowaad 600.

Example 6

The organosilicon compound of formula (6) was prepared by the same procedure as in Example 1 except that Kyowaad 100 was replaced by the same amount of Kyowaad 700.

Example 7

The organosilicon compound of formula (6) was prepared by the same procedure as in Example 1 except that Kyowaad 100 was replaced by the same amount of Kyowaad 2000.

Comparative Example 1

The organosilicon compound of formula (6) was prepared by the same procedure as in Example 1 except that Kyowaad 100 was omitted.

Comparative Example 2

A 5-L separable flask equipped with a stirrer, reflux condenser, dropping funnel and thermometer was charged with 2,028 g (18.4 mol) of methyl isobutyl ketone. At an internal temperature of 105-110° C., 540 g (3.01 mol) of 3-aminopropyltrimethoxysilane having a chlorine content of 5 ppm was added dropwise over 1 hour, followed by stirring at 115° C. for 6 hours. During dropwise addition and aging, water formed by reaction was removed by refluxing along with methyl isobutyl ketone. Analysis by gas chromatograph confirmed that the peaks assigned to 3-aminopropyltrimethoxysilane disappeared. After aging, 1,660 g of pale yellow transparent solution was obtained.

To the solution, 1.2 g (0.06 wt % relative to methyl isobutyl ketone) of Kyowaad 100 was added, followed by stirring in nitrogen atmosphere at room temperature for 6 hours. From the solution, Kyowaad 100 was removed by pressure filtration. The resulting solution was distilled under conditions: 10 Torr and 170° C. for purification, obtaining 693 g of colorless transparent liquid. On $^1$H-NMR analysis, it was identified as organosilicon compound of formula (6).

[Example 8] Preparation of Organosilicon Compound (7)

[Chem. 7]

(7)

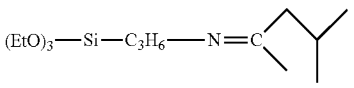

A 5-L separable flask equipped with a stirrer, reflux condenser, dropping funnel and thermometer was charged with 2,028 g (18.4 mol) of methyl isobutyl ketone and 1.2 g (0.06 wt % relative to methyl isobutyl ketone) of Kyowaad 100. At an internal temperature of 105-110° C., 667 g (3.01 mol) of 3-aminopropyltriethoxysilane having a chlorine content of 5 ppm was added dropwise over 1 hour, followed by stirring at 115° C. for 8 hours. During dropwise addition and aging, water formed by reaction was removed by refluxing along with methyl isobutyl ketone. Analysis by gas chromatograph confirmed that the peaks assigned to 3-aminopropyltriethoxysilane disappeared. After aging, 1,550 g of pale yellow transparent solution was obtained. The solution was distilled under conditions: 10 Torr and 170° C. for purification, obtaining 835 g (yield 91.4%) of colorless transparent liquid. On $^1$H-NMR analysis, it was identified as organosilicon compound of formula (7).

Example 9

The organosilicon compound of formula (7) was prepared by the same procedure as in Example 8 except that Kyowaad 100 was replaced by the same amount of Kyowaad 200.

Example 10

The same procedure as in Example 8 was repeated except that Kyowaad 100 was replaced by the same amount of Kyowaad 300.

Example 11

The organosilicon compound of formula (7) was prepared by the same procedure as in Example 8 except that Kyowaad 100 was replaced by the same amount of Kyowaad 500.

Example 12

The organosilicon compound of formula (7) was prepared by the same procedure as in Example 8 except that Kyowaad 100 was replaced by the same amount of Kyowaad 600.

Example 13

The organosilicon compound of formula (7) was prepared by the same procedure as in Example 8 except that Kyowaad 100 was replaced by the same amount of Kyowaad 700.

Example 14

The organosilicon compound of formula (7) was prepared by the same procedure as in Example 8 except that Kyowaad 100 was replaced by the same amount of Kyowaad 2000.

Comparative Example 3

The organosilicon compound of formula (7) was prepared by the same procedure as in Example 8 except that Kyowaad 100 was omitted.

Comparative Example 4

A 5-L separable flask equipped with a stirrer, reflux condenser, dropping funnel and thermometer was charged with 2,028 g (18.4 mol) of methyl isobutyl ketone. At an internal temperature of 105-110° C., 667 g (3.01 mol) of 3-aminopropyltriethoxysilane having a chlorine content of 5 ppm was added dropwise over 1 hour, followed by stirring at 115° C. for 6 hours. During dropwise addition and aging, water formed by reaction was removed by refluxing along with methyl isobutyl ketone. Analysis by gas chromatograph confirmed that the peaks assigned to 3-aminopropyltriethoxysilane disappeared. After aging, 2,070 g of pale yellow transparent solution was obtained.

To the solution, 1.2 g (0.06 wt % relative to methyl isobutyl ketone) of Kyowaad 100 was added, followed by stirring in nitrogen atmosphere at room temperature for 6 hours. From the solution, Kyowaad 100 was removed by pressure filtration.

The resulting solution was distilled under conditions: 10 Torr and 170° C. for purification, obtaining 802 g (yield 87.8%) of colorless transparent liquid. On $^1$H-NMR analysis, it was identified as organosilicon compound of formula (7).

TABLE 1

| | Organosilicon compound | Adsorbent Kyowaad No. | Yield, % |
|---|---|---|---|
| Example 1 | (6) | 100 | 91.5 |
| Example 2 | (6) | 200 | 91.6 |
| Example 3 | (6) | 300 | 91.8 |
| Example 4 | (6) | 500 | 92.5 |
| Example 5 | (6) | 600 | 92.3 |
| Example 6 | (6) | 700 | 92.4 |
| Example 7 | (6) | 2000 | 91.9 |
| Comparative Example 1 | (6) | — | 71.8 |
| Comparative Example 2 | (6) | 100 | 87.4 |
| Example 8 | (7) | 100 | 91.4 |
| Example 9 | (7) | 200 | 91.9 |
| Example 10 | (7) | 300 | 92.3 |
| Example 11 | (7) | 500 | 93.5 |
| Example 12 | (7) | 600 | 93.8 |
| Example 13 | (7) | 700 | 92.0 |
| Example 14 | (7) | 2000 | 92.2 |
| Comparative Example 3 | (7) | — | 72.3 |
| Comparative Example 4 | (7) | 100 | 87.8 |

As shown in Table 1, the yield of the organosilicon compounds obtained in Examples according to the inventive preparation method is more than 90%. Satisfactory recovery yields are confirmed.

The invention claimed is:

1. A method for preparing an organosilicon compound having a ketimine structure, represented by the formula (1):

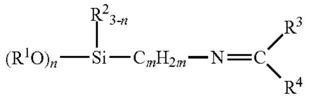

(1)

wherein $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, $R^3$ and $R^4$ are each independently hydrogen, a $C_1$-$C_{10}$ alkyl group or $C_6$-$C_{10}$ aryl group, n is an integer of 1 to 3, and m is an integer of 1 to 12, the method comprising the step of reacting an amino-containing organosilicon compound having the formula (2) with a carbonyl compound having the formula (3) in the presence of an inorganic adsorbent,

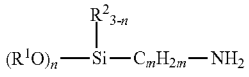

(2)

-continued

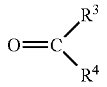

(3)

wherein $R^1$, $R^2$, $R^3$, $R^4$, n, and m are as defined above, and wherein the inorganic adsorbent is at least one member selected from the group consisting of aluminum hydroxide, hydrotalcite, magnesium silicate, aluminum silicate, and aluminum oxide/magnesium oxide solid solution.

2. The method of claim 1, further comprising the step of taking out the organosilicon compound having formula (1) by distillation purification.

3. The method of claim 1 wherein the inorganic adsorbent is synthetic hydrotalcite.

4. The method of claim 1 wherein $R^1$ is methyl or ethyl, $R^3$ is isobutyl, $R^4$ is methyl, both m and n are 3.

* * * * *